(12) United States Patent
Ko et al.

(10) Patent No.: US 8,421,638 B2
(45) Date of Patent: Apr. 16, 2013

(54) METHOD FOR REMINDING OF BATTERY POWER LEVEL

(75) Inventors: Li Li Ko, Jhonghe (TW); Chi-Hun Huang, Jhonghe (TW)

(73) Assignee: MSI Computer(Shenzhen)Co., Ltd., Logma Information Technology Industrial Park, Tangtou Village, Shiyan Town, Baoan District, Shenzhen, Guangdong Province (CN)

( * ) Notice: Subject to any disclaimer, the term of this patent is extended or adjusted under 35 U.S.C. 154(b) by 396 days.

(21) Appl. No.: 12/762,489

(22) Filed: Apr. 19, 2010

(65) Prior Publication Data
US 2011/0175723 A1    Jul. 21, 2011

(30) Foreign Application Priority Data
Jan. 15, 2010   (TW) .............................. 99101077 A

(51) Int. Cl.
*G08B 21/00*    (2006.01)
(52) U.S. Cl.
USPC ...................... 340/636.1; 340/539.1; 345/619
(58) Field of Classification Search ............... 340/539.1, 340/636.1; 345/619
See application file for complete search history.

(56) References Cited

U.S. PATENT DOCUMENTS

| | | | |
|---|---|---|---|
| 3,979,657 A * | 9/1976 | Yorksie | 320/136 |
| 7,938,548 B2 * | 5/2011 | Nozaki et al. | 353/119 |
| 8,145,130 B2 * | 3/2012 | Hsieh | 455/41.2 |
| 2004/0130556 A1 * | 7/2004 | Nokiyama | 345/617 |
| 2007/0188429 A1 * | 8/2007 | Yamaguchi et al. | 345/88 |
| 2008/0141049 A1 * | 6/2008 | Hassan et al. | 713/320 |
| 2010/0125374 A1 * | 5/2010 | Lee | 700/295 |
| 2010/0277326 A1 * | 11/2010 | Berk et al. | 340/636.11 |

* cited by examiner

*Primary Examiner* — George Bugg
*Assistant Examiner* — Naomi Small
(74) *Attorney, Agent, or Firm* — Winston Hsu; Scott Margo

(57) ABSTRACT

The present invention discloses a method for reminding of a battery power level, which generates a grading instruction according to the battery power level of an electronic device, and which controls the electronic device to present an obvious reminder corresponding to the grading instruction. The present invention uses a progressively intensified visual reminder to stepwise semi-compel the user to notice the insufficiency of the battery power and respond to the reminding. Thereby, the present invention can guarantee that the user indeed knows the status of the residual electric energy of the battery.

12 Claims, 4 Drawing Sheets

The cursor grows larger with the descending of the battery power level

METHOD FOR REMINDING OF BATTERY POWER LEVEL

BACKGROUND OF THE INVENTION

1. Field of the Invention

The present invention relates to a method for reminding a user of a battery power level, particularly to a method for reminding a user of the battery power level of an operating electronic device.

2. Description of the Related Art

With the rapid development of information technology, compact, lightweight and portable electronic devices are very popular now, such as notebook computers, personal digital assistants and mobile phones, which can work anywhere and anytime and provide much convenience for users in working, living and amusement.

Among the portable electronic devices, notebook computers are the most power-consuming products. When a notebook computer plugs in the commercial power, the commercial power charges the battery. In such a case, no battery power is consumed. When the notebook computer is powered by the battery, it can only operate for a limited interval of time because of the limited capacity of the battery. The current notebook computers usually present an indicator to show the residual electric energy of the battery on the lower left corner of the user interface of the display screen. The indicator usually has only four or five increments and thus can only roughly show the status of the residual electric energy. Besides, users are likely to ignore the indicator because it is neither active nor obvious. Further, the residual operation time, which is calculated from the residual electric energy and shown on the screen, is usually inaccurate. For example, although the user interface presents that the residual electric energy can sustain the notebook computer for 50 minutes, the notebook computer may enter into the sleep mode or turn off 20 minutes later. The user, who is busy treating data, usually neglects the warning and thus has to turn off the notebook computer hastily or faces the sleeping of the notebook computer suddenly. In such a case, the user cannot help but interrupt data processing or is even too late to preserve the data.

Accordingly, the present invention proposes a method for reminding of a battery power level to force the user to attend to insufficiency of battery power and prepare for the sleeping or turn-off of the notebook computer in advance.

SUMMARY OF THE INVENTION

The primary objective of the present invention is to provide a method for reminding of a battery power level, which grades the amount of the residual electric energy of a battery, and which presents progressively intensified visual reminder on the screen according to the grades of the power levels to stepwise remind the user of the battery power levels, and which semi-compels the user to respond to the reminder to exempt the user from ignoring the battery power level and push the user to backup data or accelerate the process of the current work.

Another objective of the present invention is to provide a method for reminding of a battery power level, which uses a humanized user interface to intimately and effectively force the user to notice the reminder of insufficient electric energy.

To achieve the abovementioned objectives, the present invention proposes a method for reminding of a battery power level, which reminds the user of the battery power level of an electronic device having a display, and which comprises steps: detecting a power level of at least one battery of the electronic device; generating a grading instruction corresponding to the power level; and controlling the electronic device to present a reminder on the display according to the grading instruction, for example, controlling the electronic device to vary the brightness of the display, vary the size of the cursor, vary the window, or distort the characters or figures. The less the electric energy of the battery, the higher the grade of the grading instruction, and the more obvious the reminder. Thereby, the method of the present invention guarantees that the user would notice the reminder of the battery power level.

Below, the embodiments are described in detail in cooperation with the attached drawings to make easily understood the objectives, technical contents, characteristics and accomplishments of the present invention.

DETAILED DESCRIPTION OF THE INVENTION

The present invention proposes a method for reminding of a battery power level, which uses an obvious reminder to certainly remind the user of the battery power level of the operating electronic device. The electronic device may be a notebook computer, a personal digital assistant or a mobile phone. Below, a notebook computer is used to exemplify the method of the present invention.

Figure 1:
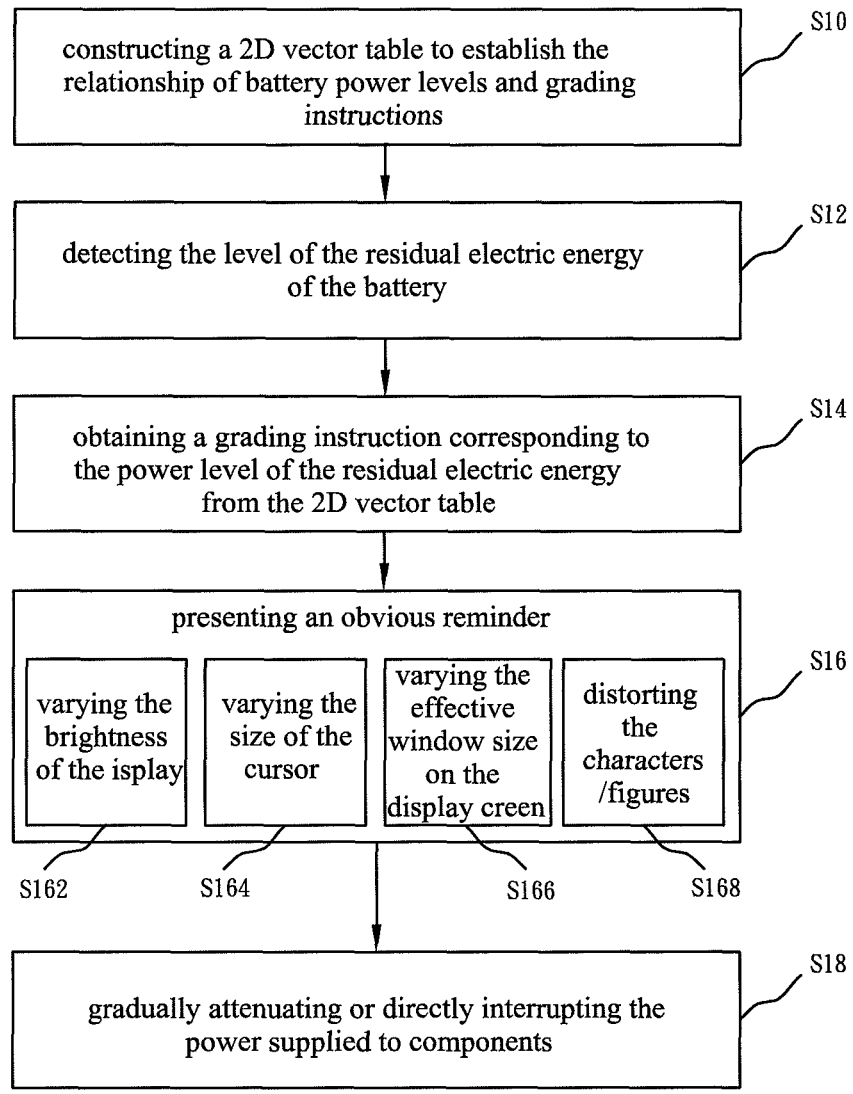
FIG. 1 is a main flowchart of a method for reminding of a battery power level according to one embodiment of the present invention.

Refer to FIG. 1 for a main flowchart of a method for reminding of a battery power level according to the present invention. When the user begins to use the notebook computer, the system will perform initialization. In Step S10, a 2D vector table is constructed to establish the relationship of the battery power levels and the grading instructions. Next, in Step S12, the system persistently detects the level of the residual electric energy of the battery. In Step S14, if the residual electric energy sustains the notebook computer for a time interval less than a predetermined value, the system obtains a grading instruction corresponding to the power level of the residual electric energy from the 2D vector table. In Step S16, the operating system of the notebook computer controls the display to present an obvious reminder according to the grading instruction. In other words, the method of the present invention controls the display to present visual reminders, which are intensified stepwise, to remind the user of the battery power levels. The less the electric energy of the battery, the higher the grade of the grading instruction, and the more obvious the reminder. In Step S16, the obvious reminder may be realized via varying the brightness of the display (S162), varying the size of the cursor (S164), varying the effective window size on the display screen (S166), or distorting the characters or figures (S168).

In Step S18, after presenting an obvious reminder to the user, the system gradually attenuates or directly interrupts the power supplied to the components unnecessary for real work, such as the wireless transmission module, the wireless network module, the Wi-Fi wireless network module, a sound card, or a multimedia player. A step of detecting whether the components are operating (not shown in the drawing) may be arranged before attenuating or interrupting the power supplied to components. In FIG. 1, Step S18 of attenuating or interrupting the supplied power is arranged behind Step S16 of presenting the obvious reminder. In another embodiment of the present invention, Step S18 is alternatively arranged behind Step S14 or executed simultaneously with Step S16.

Figure 2:
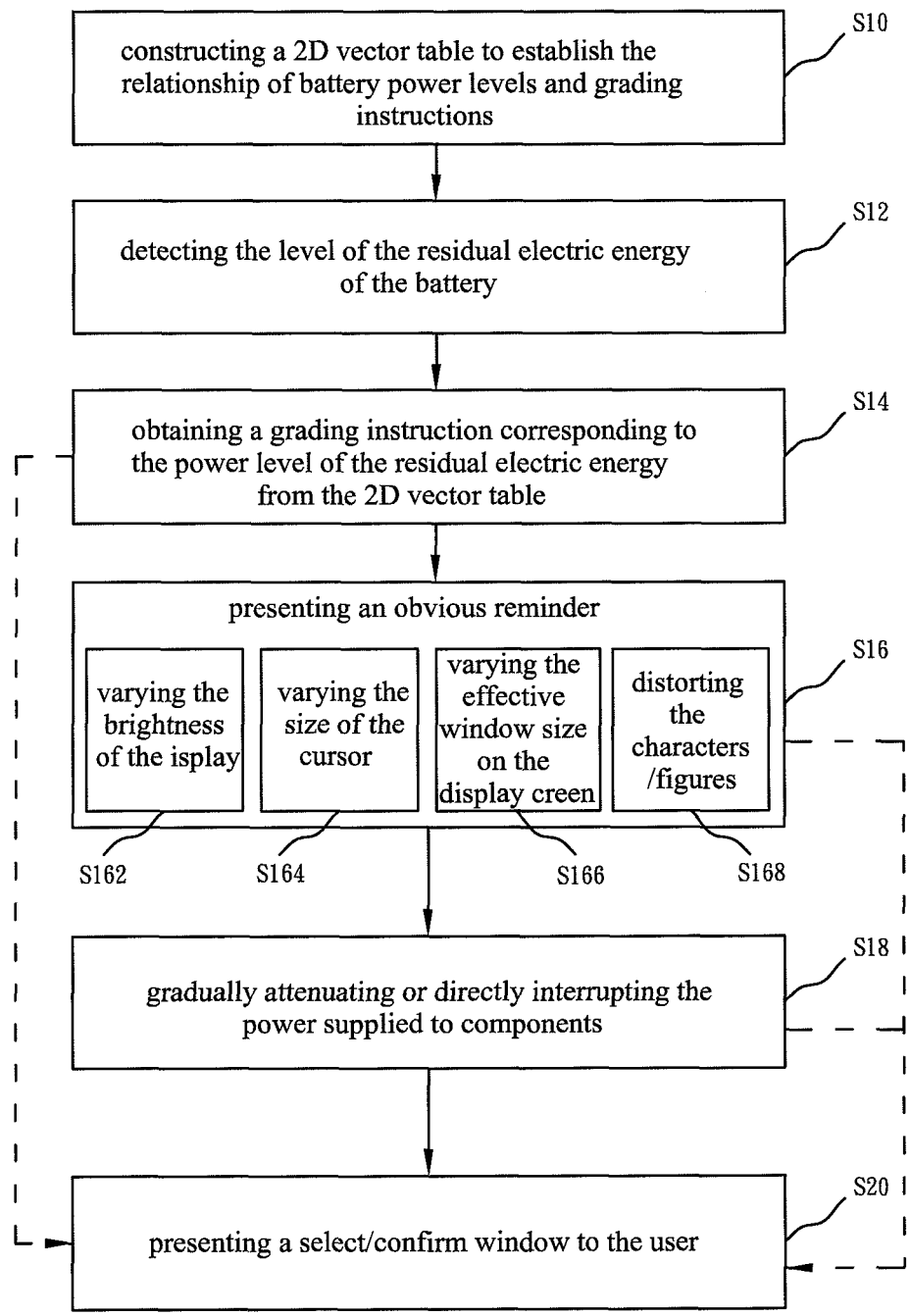
FIG. 2 is a flowchart with a step of presenting a select/confirm window of a method for reminding of a battery power level according to one embodiment of the present invention.

Refer to FIG. 2. In yet another embodiment, the method of the present invention further comprises a step of presenting a select/confirm window to the user (Step S20). Step S20 may be executed together with another step of the method. For example, when a grading instruction is obtained in Step S14, Step S20 is undertaken to present the select/confirm window on the display, whereby the user selects/confirms the priority sequence provided by the select/confirm window to determine the priority sequence of preserving the programs or decides whether to close the idle programs. In the present invention, Step S20 may be undertaken with Step S16 or Step S18 according to the design of the manufacturer or the requirement of the user.

In the present invention, the less the residual electric energy of the battery, the higher the grade of the grading instruction, and the more obvious the reminder or the greater the reminder. The way to realize the obvious reminder varies in different embodiments. When the obvious reminder is realized via varying the size of the cursor, the cursor becomes larger with the decreasing residual electric energy. When the obvious reminder is realized via varying the effective size of the window on the screen, the window becomes smaller with the decreasing residual electric energy. When the obvious reminder is realized via varying the brightness of the display, the display becomes darker with the decreasing residual electric energy, wherein the CPU (Central Processing Unit) of the notebook computer generates a control instruction to the display driver circuit, and the display driver circuit varies the driving current to adjust the brightness of the display.

Figure 3:
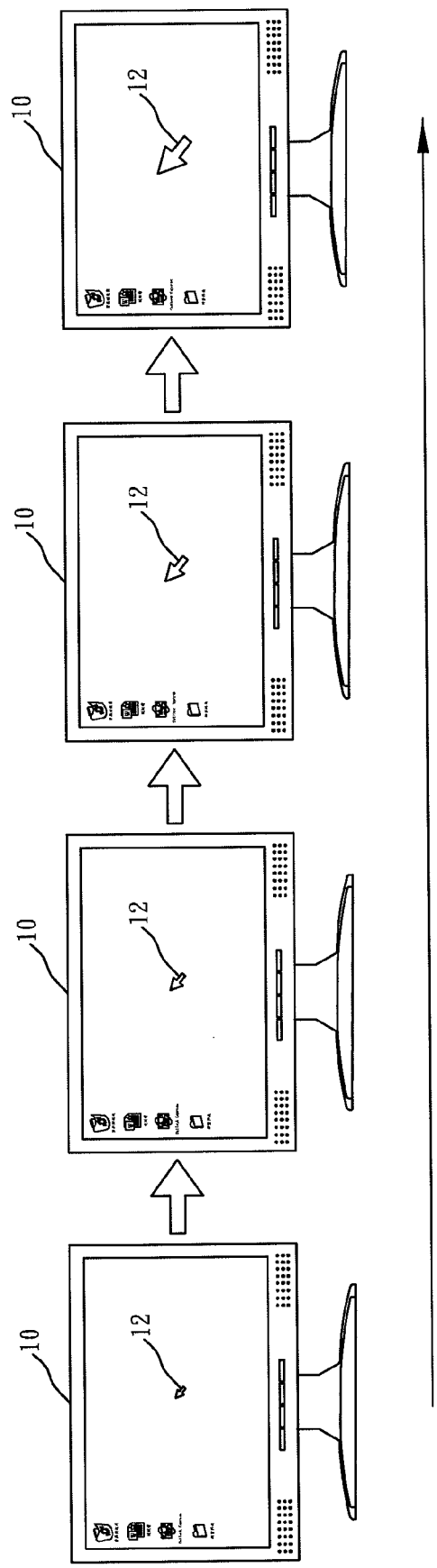
FIG. 3 is a diagram schematically showing that an obvious reminder is realized via varying the size of a cursor according to one embodiment of the present invention.

According to the levels of the residual electric energy, the method of the present invention stepwise presents different-grade obvious reminders on the user interface of the display to remind the user of the battery power levels. Refer to FIG. 3. In this embodiment, the size variation of a cursor 12 is used as the obvious reminder. The cursor 12 becomes larger with the decreasing residual electric energy. Herein, the size of the cursor 12 varies by four stages. However, the present invention does not limit the number of the stages of cursor size variation. In the present invention, the number of the stages of cursor size variation can be set with software.

Figure 4:
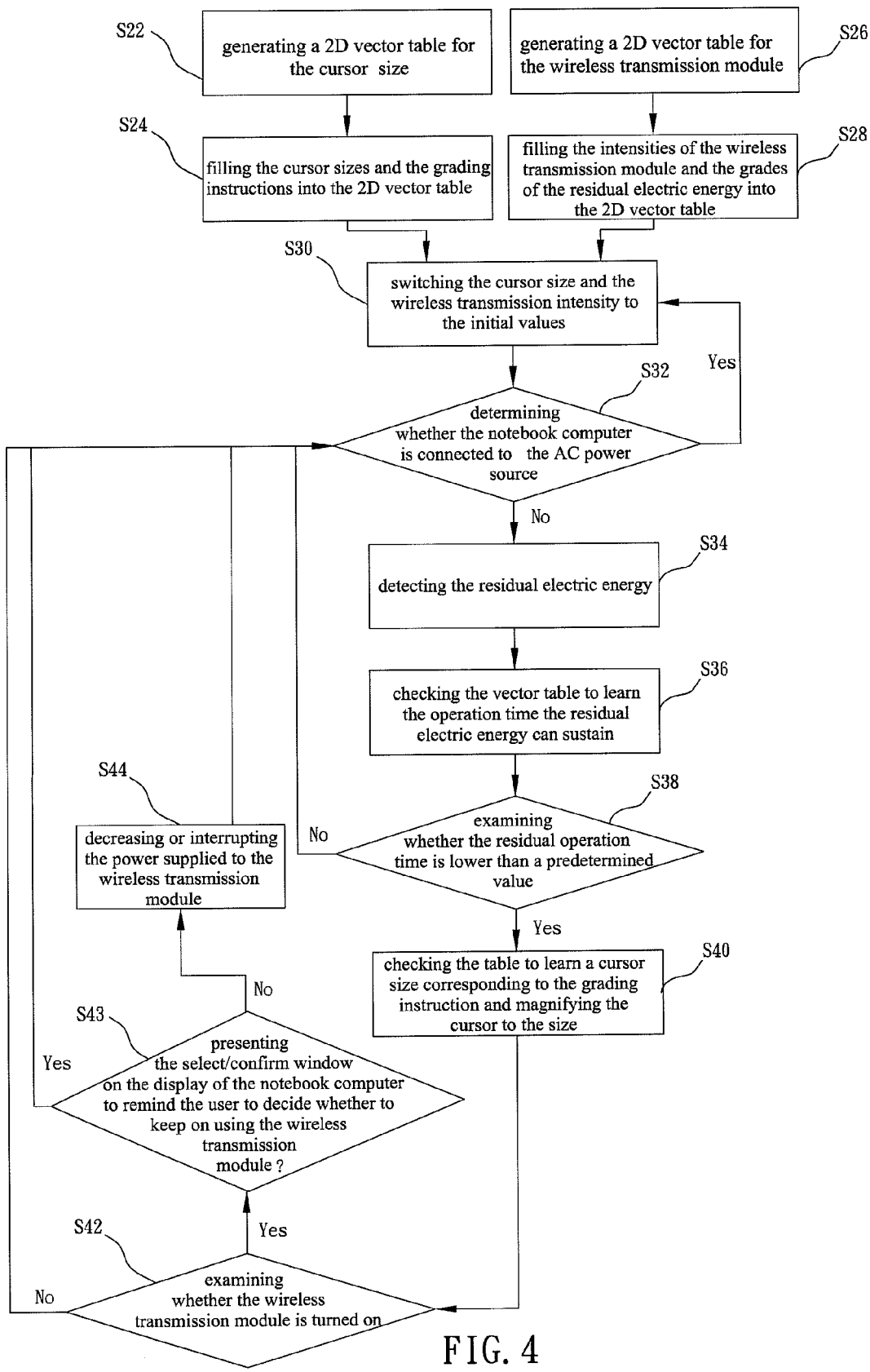
FIG. 4 is a flowchart showing that an obvious reminder of varying the cursor size and a wireless transmission module are used to exemplify the present invention.

Below, the obvious reminder of varying the cursor size and the wireless transmission module are used to exemplify the present invention. Refer to FIG. 4. In Step S22, a 2D vector table for the cursor size is generated by the system of the notebook computer. In Step S24, the grades of cursor sizes and the grading instructions are filled into the 2D vector table. In Step S26, a 2D vector table for the wireless transmission module is generated. In Step S28, the intensities of the wireless transmission module and the grades of the residual electric energy are filled into the 2D vector table. In Step S30, the cursor size and the wireless transmission intensity are switched to the initial values predetermined by the system. In Step S32 is determined whether the notebook computer is connected to the AC power source. If the notebook computer is connected to the AC power source, the process returns to Step S30. If the notebook computer is not connected to the AC power source, the process proceeds to Step S34. In Step S34, the system detects the residual electric energy. In Step S36, the system check the vector table to learn the operation time the residual electric energy can sustain. In Step S38, the system examines whether the residual operation time is lower than a predetermined value. If the residual operation time is not lower than a predetermined value, the process returns to Step S32. If the residual operation time is lower than a predetermined value, the process proceeds to Step S40. In Step S40, the system checks the table to learn a cursor size corresponding to the grading instruction and controls the display to magnify the cursor to the size. In Step S42, the system examines whether the wireless transmission module is turned on. If the wireless transmission module is not turned on, the process returns to Step S32. If the wireless transmission module is turned on, the process proceeds to Step S43. In Step S43, the system presents the select/confirm window on the display of the notebook computer to remind the user to decide whether to keep on using the wireless transmission module. If the user decides to keep on using the wireless transmission module, the process returns to Step S32. If the user decides not to keep on using the wireless transmission module or decides to lower the power consumption of the wireless transmission module, the process proceeds to Step S44. In Step S44, the system decreases or interrupts the power supplied to the wireless transmission module to reduce the power consumption. Then, the process returns to Step S32.

In conclusion, the present invention uses progressively intensified visual reminder to stepwise semi-compel the user to notice the insufficiency of the battery power and respond to the reminding. Thereby, the present invention can exempt the user from ignoring the battery power status and push the user to backup data or accelerate the process of the current work. Therefore, the present invention provides a humanized user interface to intimately and effectively force the user to notice the reminder of insufficient electric energy.

The embodiments described above are only to demonstrate the technical contents and characteristics of the present invention to enable the persons skilled in the art to understand, make, and use the present invention. However, the embodiments are not intended to limit the scope of the present invention. Any equivalent modification or variation according to the spirit of the present invention is to be also included within the scope of the present invention.

What is claimed is:

1. A method for reminding of a battery power level, which reminds a user of a battery power level of an electronic device having at least one display, comprising steps:

detecting a power level of at least one battery of said electronic device;

generating a grading instruction corresponding to said power level; and controlling said electronic device to present an obvious reminder on said display according to said grading instruction, wherein said obvious reminder is realized via varying size of a cursor.

2. The method for reminding of a battery power level according to claim 1, wherein a grade of said grading instruction rises with descending of said battery power level, and said obvious reminder becomes more obvious or larger with rising of said grade of said grading instruction.

3. The method for reminding of a battery power level according to claim 2, wherein said obvious reminder is realized via varying brightness of said display, varying size of a cursor, varying a window of said display, or varying characters or figures on said display.

4. The method for reminding of a battery power level according to claim 1, further comprising a step of gradually attenuating or directly interrupting power supplied to at least one component which does not affect real work inside said electronic device.

5. The method for reminding of a battery power level according to claim 4, wherein said component is a wireless transmission module, a sound card, or a multimedia player.

6. The method for reminding of a battery power level according to claim 5, wherein said wireless transmission module is a Bluetooth wireless transmission module, a wireless network module, or a WiFi wireless network module.

7. The method for reminding of a battery power level according to claim 1 further comprising a step of generating a select/confirm window, whereby the user selects/confirms a priority sequence provided by said select/confirm window to determine a priority order of preserving programs or determines whether to close idle programs.

8. The method for reminding of a battery power level according to claim 4 further comprising a step of generating a select/confirm window, whereby the user selects/confirms a priority sequence provided by said select/confirm window to determine a priority order of preserving programs or determines whether to close idle programs.

9. The method for reminding of a battery power level according to claim 4 further comprising a step of detecting whether said components are turned on before gradually attenuating or directly interrupting power supplied to said components.

10. The method for reminding of a battery power level according to claim 1, wherein said obvious reminder is realized via varying size of said cursor, and said cursor becomes larger with decreasing of said power level.

11. The method for reminding of a battery power level according to claim 1, wherein a 2D vector table is used to record a relationship between said power levels and said grading instructions; one said grading instruction is obtained from said 2D vector according to one said power level.

12. The method for reminding of a battery power level according to claim 1, wherein the varying size of the cursor is intensified stepwise corresponding to said power level.

* * * * *